(12) United States Patent
Rees et al.

(10) Patent No.: US 11,339,511 B2
(45) Date of Patent: May 24, 2022

(54) STABILIZATION AND LAMINATION OF TEXTILES USING LAYERS OF VARIABLE MELT INDEX AND CHEMICAL COMPOSITION

(71) Applicant: ENGINEERED FLOORS LLC, Dalton, GA (US)

(72) Inventors: John Joseph Matthews Rees, Chattanooga, TN (US); Stephen Tsiarkezos, Elkton, MD (US); Dimitri Zafiroglu, Centreville, DE (US); Anthony Daniell, Dalton, GA (US)

(73) Assignee: ENGINEERED FLOORS LLC, Dalton, GA (US)

( * ) Notice: Subject to any disclaimer, the term of this patent is extended or adjusted under 35 U.S.C. 154(b) by 52 days.

(21) Appl. No.: 16/855,620

(22) Filed: Apr. 22, 2020

(65) Prior Publication Data
US 2020/0340153 A1     Oct. 29, 2020

Related U.S. Application Data

(60) Provisional application No. 62/837,527, filed on Apr. 23, 2019.

(51) Int. Cl.
*B32B 7/09*      (2019.01)
*D04B 21/00*     (2006.01)
(Continued)

(52) U.S. Cl.
CPC .............. *D04B 21/165* (2013.01); *B32B 3/26* (2013.01); *B32B 5/06* (2013.01); *B32B 5/26* (2013.01);
(Continued)

(58) Field of Classification Search
CPC .............................. B32B 7/09; D04B 21/165
See application file for complete search history.

(56) References Cited

U.S. PATENT DOCUMENTS

| | | |
|---|---|---|
| 3,867,243 A | 2/1975 | Stoller |
| 5,198,277 A | 3/1993 | Hamilton et al. |
| | (Continued) | |

FOREIGN PATENT DOCUMENTS

| | | |
|---|---|---|
| WO | 2019027689 A1 | 2/2019 |
| WO | 2019046181 A1 | 3/2019 |

OTHER PUBLICATIONS

International Search Report and Written Opinion in corresponding/related International Application No. PCT/US20/29314 dated Jul. 24, 2020.

*Primary Examiner* — Andrew T Piziali
(74) *Attorney, Agent, or Firm* — Patent Portfolio Builders PLLC

(57) ABSTRACT

Stabilizing a fabric layer and simultaneously laminating a fabric to a bulky and cushioning backing layer using multiple internal adhesive layers placed within the fabric layer forms a composite textile. The melt index, weight and chemical compatibility of the adhesive layers versus the adjacent fabric sub-strata and the backing layer are adjusted to achieve the desired penetration of molten adhesive, mechanical bonding and chemical bonding. An optional external adhesive layer with a low melt index can be added between the fabric layer and the backing layer to facilitate attachment to a highly porous backing.

29 Claims, 3 Drawing Sheets

(51) Int. Cl.
  *D04B 21/16* (2006.01)
  *B32B 3/26* (2006.01)
  *B32B 5/06* (2006.01)
  *B32B 7/027* (2019.01)
  *B32B 7/12* (2006.01)
  *C09J 5/06* (2006.01)
  *B32B 5/26* (2006.01)

(52) U.S. Cl.
  CPC ............... *B32B 7/027* (2019.01); *B32B 7/09* (2019.01); *B32B 7/12* (2013.01); *C09J 5/06* (2013.01); *B32B 2262/0276* (2013.01); *B32B 2471/00* (2013.01)

(56) References Cited

U.S. PATENT DOCUMENTS

| | | |
|---|---|---|
| 2002/0119281 A1 | 8/2002 | Higgins et al. |
| 2003/0215618 A1 | 11/2003 | Hynicka et al. |
| 2004/0106346 A1* | 6/2004 | Zafiroglu ............ E04F 13/0871 442/149 |
| 2005/0003141 A1 | 1/2005 | Zafiroglu |
| 2009/0047465 A1* | 2/2009 | Zafiroglu ................. B32B 3/28 428/97 |
| 2009/0280710 A1* | 11/2009 | Zafiroglu ................. D04H 1/60 442/405 |
| 2019/0032254 A1 | 1/2019 | Zafiroglu et al. |
| 2019/0061330 A1 | 2/2019 | Rees et al. |

\* cited by examiner

STABILIZATION AND LAMINATION OF TEXTILES USING LAYERS OF VARIABLE MELT INDEX AND CHEMICAL COMPOSITION

CROSS-REFERENCE TO RELATED APPLICATIONS

The present application claims priority to U.S. Provisional Patent Application No. 62/837,527, filed Mar. 23, 2019, the entire contents of which are incorporated herein by reference.

TECHNICAL FIELD

Embodiments of the subject matter disclosed herein relate to adhesive bonding and stabilizing of composite textile sheets.

BACKGROUND

Polymeric thermoplastic adhesive layers activated by heat and pressure are commonly used in the textile industry to attach textile layers to other layers including textile layers and non-textile layers. These polymeric thermoplastic layers are also used to secure fibrous elements located between or adjacent the layers. Suitable thermoplastic layers melt at temperatures lower than the melting temperatures of adjacent or surrounding layers or elements. These polymeric thermoplastic layers are also used to stabilize or to reinforce textile fabrics by being placed within the textile fabrics and activated by heat and pressure.

The polymeric thermoplastic layers form molten adhesive upon exposure to heat. This molten adhesive is normally propelled into the adjacent or surrounding layers or fibrous elements by applied pressure. Variable or unequal adhesion to adjacent layers, surrounding layers and fibrous elements occurs when the molten adhesive does not proceed into the adjacent or surrounding layers and fibrous elements in a manner that accommodates the differences in porosity or propensity to adhere.

The molten adhesive is preferably propelled by pressure between layers, and also between individual yarns and individual fibers forming the yarns to encapsulate and secure the structure, forming virtual "mechanical bonds" holding all neighboring fibers and yarns in place.

Yarns, fibers and fiber tufts present within the surrounding or adjacent layers, having dissimilar propensities for chemical bonding to similar polymers or different porosities, can still result in unequal or variable adhesion even if the molten polymer proceeds uniformly into adjacent layers. The final result can be adhesion onto a first layer with little or no adhesion to a second layer or failure to secure fibrous elements within one or more layers.

Attempts at overcoming variable, incomplete or uneven adhesion have in the past used copious amounts of faster-flowing, low-viscosity, high melt flow index (HMI) adhesives in attempting to secure, at a minimum, extensive mechanical bonding. For example, copious amounts of liquid adhesives have been used on the back of tufted fabrics to inundate, envelop and secure the tufted back-laps onto the primary backing with the adhesive, usually also accompanied with the attachment of a secondary backing over the back-laps. When attempts are made to use solid thermoplastic polymeric HMI adhesives, the molten polymer proceeds into the more porous or more receptive layers or elements when a composite is pressed and heated or re-heated to stabilize the fabric, or when the composite is embossed to create a 3-dimensional effect. Increasing the weight of the low-melt/high HMI adhesive layers may fail to increase melted adhesive flow into sufficiently preferred adjacent layers. Furthermore, in the absence of chemical affinity or chemical compatibility between the adhesive and the fibers in the adjacent layers, which is necessary to form a chemical bond, the individual fiber or filament stability can remain poor. The result is insufficient overall adhesion, insufficient surface abrasion resistance, insufficient edge unraveling resistance and insufficient final delamination resistance.

One attempt at controlling adhesive propagation among the layers of a textile fabric is discussed in U.S. Patent Application Publication No. 2019/0032254 and International Patent Application Publication No. WO 2019/027689, which uses non-melting blocking layers adjacent to or surrounded by low-melting adhesive layers to direct the flow of melted adhesives into less receptive or less porous layers or elements. The blocking layers can be impermeable or can be partially permeable or perforated to allow the flow of melted adhesive to bridge across or through the blocking layer and to secure the blocking layer. The adhesive layers and blocking layers may be included within a fabric or used adjacent to a fabric to attach it to another layer. For attachment to another layer with satisfactory delamination resistance the use of these blocking layers requires a high degree of adhesive compatibility between the blocking and adhesive layers. Impermeable and incompatible blocking layers must be pre-attached to the adhesive layers and the surrounding layers by mechanical or textile processes such as needle-punching or stitch-bonding, adding extra pre-processing steps. Perforated incompatible blocking layers will require a high percentage of open perforated surface to bridge across and secure the layers, and consequently higher amounts of adhesive, also resulting in elevated stiffness, loss of thickness, and an increase in overall cost.

Another limitation of the blocking layers is that, since they do not melt during the adhesion process, they can limit the degree to which a surface or an entire fabric can be three-dimensionally formed during the adhesion process because the blocking layers remain relatively stiff and resist heated formation. This resistance can not only limit the degree of three-dimensional formation but, at the extreme, cause bursting and failing due to the high localized stress during the forming process. Furthermore, fluctuations in raw material ambient temperature creates variability in process temperature profiles leading to a higher degree of variability in adhesion strength. Therefore, a process for control of the flow of adhesion that overcomes these limitations is desired.

U.S. Patent Application Publication No. 2019/0061330 and International Patent Application Publication No. WO 2019/046181 address adhesive propagation by using multiple layers of adhesives having different melt indexes. High melt index (HMI) layers are positioned to proceed into adjacent less porous, denser or less receptive adjacent layers or fabric strata to allow the propagation of molten adhesive, while adjacent low melt index (LMI) layers temporarily block the flow of the HMI layers in the opposite direction. The LMI layers eventually also melt and flow into the adjacent strata. Further, the LMI layer can also be a higher melt point than the HMI skins, allowing better blocking of the flow of the lower melt point HMI skin polymer. The extra focused flow of the HMI skin impregnates and saturates the yarn in the fabric.

A need still exists, however, for textile fabrics and composites containing adhesive sublayers that address conditions that require simultaneous control of the molten adhesive polymer flow within a fabric as well as the flow through the fabric and into a cushioning backing. The need also exists for textile fabrics and composites that address the need for adhesive penetration into yarn bundles, and between the fibers and filaments forming the yarns and for forming simultaneous chemical bonds without requiring tight mechanical encapsulation and risking the crushing of low density fabrics and bulky cushioning backings using high pressures.

SUMMARY

Exemplary embodiments are directed to the use of internal layers of HMI and LMI, deployed within the fabric layer with selectively different chemical compositions and propensities to form chemical bonds or preferably simultaneous mechanical and chemical bonds between layers, between the fibers, and between and within the yarns located above the layers, below the layers or passing through the layers. The internal adhesive layers located within the fabric layer are selected to stabilize the fabric layer without allowing adhesive to reach the top surface. The internal adhesive layers also provide the simultaneous attachment to a cushioning backing with or without additional external adhesive layers deployed between the fabric and the backing.

Exemplary embodiments are directed to a method for adhesively bonding a fabric layer containing a plurality of thermoplastic fibers with molten polymeric adhesive to a backing layer and simultaneously stabilizing the fibrous elements within selected controlled depths with simultaneous mechanical and chemical bonds without allowing adhesive to reach the top surface of the fabric layer. In one embodiment, three thermoplastic internal adhesive layers of different melt indexes are positioned within the fabric layer. In one embodiment, an additional external adhesive layer is deployed between the fabric layer and a backing layer.

In addition to the selection of different melt indexes and different chemical compositions among the internal adhesive layers, the weight per unit area of each internal adhesive layer is selected to secure the desired stability of the various layers of the fabric layer and adhesion to the backing layer without unduly stiffening either the exposed top surface of the final composite textile and without excessively reducing thickness, cushion or bulk.

Examples of suitable textile fabric layers include stitch-bonded fabrics, tufted fabrics and needle-punched fabrics wherein the thermoplastic internal adhesive layers supplement or replace the traditional stitching substrates in stitch-bonding, the traditional primary backings in tufting, or intermediate reinforcing layers in needle-punching. Suitable textile fabric layers also include multilayer fabrics containing an upper fabric sublayer placed above three adhesive sublayers and followed by a lower fabric sublayer. These sublayers may or may not be inter-bonded prior to the subsequent lamination to a backing layer. Suitable backing layers include textile fabrics or felts, foamed polymeric layers or relatively solid polymeric layers intermeshed or combined with porous layers.

Exemplary embodiments create sufficient low viscosity adhesive flow not only to encapsulate the yarns but also to penetrate into the yarn bundles and the spaces between the fibers or filaments within the yarns. In addition, in exemplary embodiments, the flow of melted or molten adhesive is directed preferentially, achieving both mechanical encapsulation and chemical bonding of a majority of the yarn bundles and the filaments within the yarns. In one embodiment, low viscosity polymer flow is redirected to both the yarn segments above and below the internal adhesive layer, for example, the under-laps and over-laps of stitch-bonded yarns or the pile portions and the back-lap portions of tufted yarns. Redirecting the low viscosity polymer flow will lock the top face loop yarns in place while securing the backside yarns underfoot, reducing yarn movement, face fray and wear and cut-edge fray.

Exemplary embodiments are directed to a method for creating a composite textile by incorporating a plurality of separate internal adhesive layers in a fabric layer containing a fabric layer upper surface and a fabric layer lower surface opposite the fabric layer upper surface. The plurality of internal adhesive layers is disposed between and spaced from the fabric layer upper surface and the fabric layer lower surface. A backing layer is placed against the fabric layer lower surface, and heat or heat and pressure is applied to one or more of the fabric layer and backing layer to generate molten adhesive from the internal adhesive layers to move the molten adhesive within the fabric layer and to laminate the fabric layer to the backing layer. In one embodiment, at least three separate internal adhesive layers are incorporated. In one embodiment, at least one external adhesive layer is incorporated in the composite textile between the fabric layer lower surface and the backing layer.

In one embodiment, applying heat or heat and pressure includes contacting the fabric layer upper surface with a heated three-dimensional tool to emboss a three-dimensional pattern into the composite textile. In one embodiment, the composite textile is preheated in a constrained space before applying heat or heat and pressure, for example, the composite textile is preheated with a dual belt laminator. In one embodiment, a heat-shrinkable internal adhesive layer is included in the plurality of internal adhesive layers, and the heat-shrinkable internal adhesive layer is shrunk with heat to bulk the stitch-bonded fabric layer before applying heat or heat and pressure.

In one embodiment, incorporating the plurality of internal adhesive layers includes incorporating a first internal adhesive layer, a second internal adhesive layer and a third internal adhesive layer into the fabric layer such that the second internal adhesive layer is in contact with the first internal adhesive layer, the first internal adhesive layer is disposed between the fabric layer upper surface and the second internal adhesive layer, the third internal adhesive layer is in contact with the second internal adhesive layer, and the third internal adhesive layer is disposed between the fabric layer lower surface and the second internal adhesive layer. In one embodiment, the first internal adhesive layer contains a material that is chemically compatible with fibers in the fabric layer, and the second internal adhesive layer has a lower melt index than the first internal adhesive layer and the third internal adhesive layer. Applying heat or heat and pressure to the fabric layer generates a first molten adhesive from the first internal adhesive layer that moves through the fabric layer, forms chemical bonds with the fibers in the fabric layer and does not reach the fabric layer upper surface and generates a third molten adhesive from the third internal adhesive layer that moves through the fabric layer, past the fabric layer lower surface and into the backing layer to bond the fabric layer to the backing layer.

In one embodiment, incorporating the first internal adhesive layer includes incorporating a weight of first internal adhesive layer per unit area of the fabric layer to generate an amount of first molten polymer to move through the fabric layer without reaching the fabric layer upper surface. In one embodiment, applying heat or heat and pressure to the fabric layer includes generating first molten adhesive from the first internal adhesive layer that encapsulates individual fibers within the fabric layer and forms mechanical bonds and chemical bonds with the individual fibers. In one embodiment, the third internal adhesive layer is a material that is chemically compatible with fibers in the fabric layer, and applying heat or heat and pressure to the fabric layer involves generating third molten adhesive from the third internal adhesive layer to form mechanical bonds and chemical bonds with individual fibers in the fabric layer. In one embodiment, the second internal adhesive layer has a melt index of less than 1.0 g/10 min. In one embodiment, the second internal adhesive layer has a melt index of less than 0.5 g/10 min. In one embodiment, the third internal adhesive layer includes a material that is chemically compatible with the backing layer and has a melt index less than 1.0 g/10 min. In one embodiment, incorporating the third internal adhesive layer into the fabric layer includes varying a distance between the third internal adhesive layer and the fabric layer lower surface.

In one embodiment, applying heat or heat and pressure includes generating third molten adhesive from the third internal adhesive layer that moves through the fabric layer toward the fabric layer lower surface and does not reach the fabric layer upper surface and generating external molten adhesive from the external adhesive layer that bonds the fabric layer and the backing layer. In one embodiment, the external adhesive layer contains a material that is chemically compatible with fibers in the fabric layer and the backing layer, and applying heat or heat and pressure includes using the external molten adhesive to form mechanical bonds and chemical bonds with the fibers in the fabric layer and the backing layer. In one embodiment, the external adhesive layer has a melt index of less than 1.0 g/10 min. In one embodiment, the external adhesive layer has a melt index of less than 0.5 g/10 min.

In one embodiment, the fabric layer is a stitch-bonded fabric layer, and incorporating the plurality of internal adhesive layers involves using the plurality of internal adhesive layers as a stitching substrate for the stitch-bonded fabric layer. In one embodiment, the fabric layer is a needle-punched fabric layer or a tufted fabric layer. In one embodiment, the fabric layer, one or more of the plurality of internal adhesive layers or the backing layer contains polyesters, polyolefin, a PTEG polymer, an EVA polymer, an EAA polymer or an EMA polymer. In one embodiment, chemical compatibility among the fabric layer, the internal adhesive layers and the backing layer is varied, or melt indexes among the fabric layer, the internal adhesive layers and the backing layer are varied.

In one embodiment, the fabric layer, the first internal adhesive layer, the second internal adhesive layer and the third internal adhesive layer include EVA polymer, EAA polymer or EMA polymer, and percentages of maleic anhydride are varied among the fabric layer, the first internal adhesive layer, the second internal adhesive layer and the third internal adhesive layer. In one embodiment, the third internal adhesive layer and the backing layer include EVA polymer, EMA polymer or EAA polymer, and levels of maleic anhydride are varied between the third internal adhesive layer and the backing layer. In one embodiment, the composite textile is post-embossed with a three-dimensional heated tool after applying heat or heat and pressure.

Exemplary embodiments are directed to a method for creating a composite textile. a fabric layer, a backing layer, a first internal adhesive layer, a second internal adhesive layer and a third internal adhesive layer are selected to have chemical compatibility among the fabric layer, the first internal adhesive layer, the second internal adhesive layer, the third internal adhesive layer and the backing layer and to have desired melt indexes among the fabric layer, the first internal adhesive layer, the second internal adhesive layer, the third internal adhesive layer and the backing layer. The first internal adhesive layer, the second internal adhesive layer and the third internal adhesive layer are incorporated into the fabric layer between a fabric layer upper surface and a fabric layer lower surface opposite the fabric layer upper surface such that the second internal adhesive layer is in contact with the first internal adhesive layer, the first internal adhesive layer is disposed between the fabric layer upper surface and the second internal adhesive layer, the third internal adhesive layer is in contact with the second internal adhesive layer, and the third internal adhesive layer disposed between the fabric layer lower surface and the second internal adhesive layer. A backing layer is placed against the fabric layer lower surface, and heat or heat and pressure is applied to one or more of the fabric layer and backing layer to generate molten adhesive from the first internal adhesive layer, the second internal adhesive layer and the third internal adhesive layer, to move the molten adhesive within the fabric layer and to laminate the fabric layer to the backing layer by establishing mechanical bonds, chemical bonds or chemical and mechanical bonds among the fabric layer, first molten adhesive from the first internal adhesive layer, second molten adhesive from the second internal adhesive layer, third molten adhesive from the third internal adhesive layer and the backing layer.

Exemplary embodiments are also directed to a composite textile containing a fabric layer with a fabric layer upper face and a fabric layer lower face opposite the fabric layer upper face, a first internal adhesive layer disposed in the fabric layer, and a second internal adhesive layer disposed in the fabric layer in contact with the first internal adhesive layer. The first internal adhesive layer is disposed between the fabric layer upper surface and the second internal adhesive layer. A third internal adhesive layer is disposed on the fabric layer in contact with the second internal adhesive layer, and the third internal adhesive layer is disposed between the fabric layer lower surface and the second internal adhesive layer. A backing layer is in contact with the fabric layer lower surface and bonded to the fabric layer by the third internal adhesive layer. The first internal adhesive layer and the third internal adhesive layers include materials that are chemically compatible with fibers in the fabric layer, and a weight of the first internal adhesive layer per unit area of the fabric layer is sufficient to generate an amount of first molten polymer to move through the fabric layer without reaching the fabric layer upper surface. The second internal adhesive layer has a lower melt index than the first internal adhesive layer and the third internal adhesive layer.

DETAILED DESCRIPTION

Figure 1:
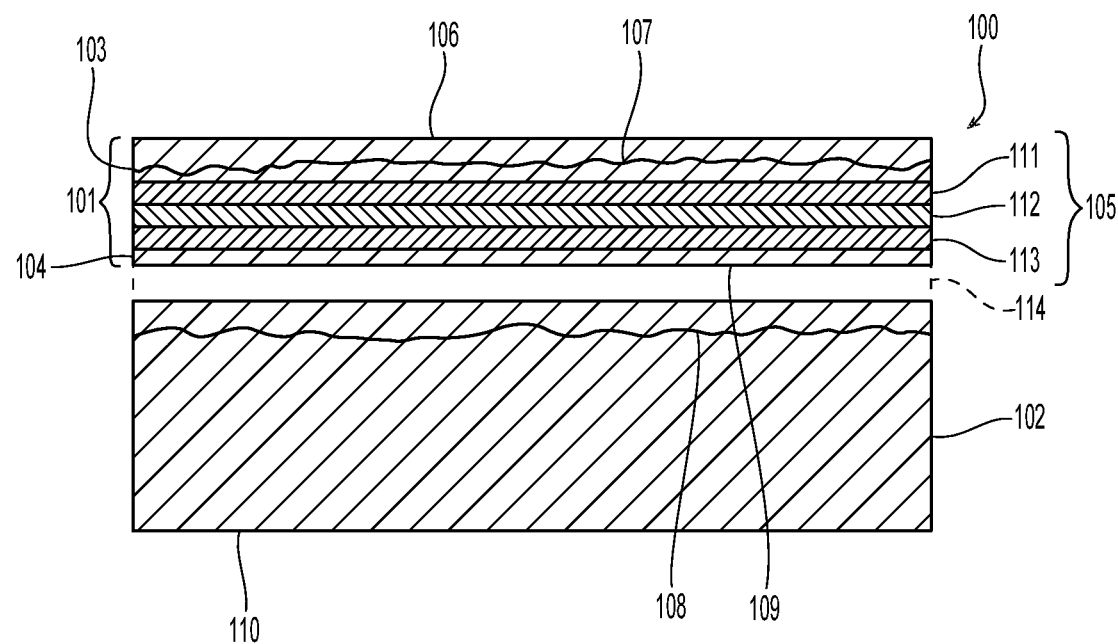
FIG. 1 is a schematic representation of an embodiment of a composite textile with a dual-layer face fabric layer containing three internal adhesive layers with the lowest internal adhesive layer located within the lower strata of the fabric layer, placed directly over a cushioning backing layer.

Exemplary embodiments utilize a plurality of internal thermoplastic adhesive layers incorporated within a fabric layer of a composite textile that containing the fabric layer and a backing layer. In one embodiment, the composite textile also includes one or more external thermoplastic adhesive layers. As used herein, internal adhesive layers are incorporated into and located within a surface layer, e.g., a fabric layer, of the composite textile. Therefore, each internal adhesive layer in a given fabric layer is located between the fabric layer upper surface and the fabric layer lower surface. Preferably, each internal adhesive layer is spaced an initial distance from the fabric layer upper surface and the fabric layer lower surface. Conversely, external adhesive layers are incorporated into the composite textile and located external to the individual layers of the composite textile, i.e., between adjacent layers.

In one embodiment, each internal adhesive layer and each external adhesive layer is a separate layer, having a desired and selected composition, chemical compatibility, weight per unit area, and melt index. In one embodiment, the plurality of internal adhesive layers is formed as a composite or laminate containing the plurality of adhesive layers as a plurality of adhesive sublayers in a single composite adhesive layer. In one embodiment, the selected composition, chemical compatibility, weight per unit area, and melt index are unique or distinct to each internal adhesive layer and external adhesive layer. Alternatively, one or more of the selected composition, chemical compatibility, weight per unit area and melt index of the plurality of internal adhesive layers and external adhesive layers can overlap or can be identical in one or more internal adhesive layers and external adhesive layers. Similarly, each layer of the composite textile, e.g., the fabric layer and the backing layer, has a selected composition, chemical compatibility, weight per unit area, and melt index, and the composition, chemical compatibility, weight per unit area, and melt index of the internal adhesive layers and external adhesive layers are selected for compatibility with the fabric layer and backing layer of the composite textile.

In one embodiment, the composite textile includes at least three internal adhesive layers. In one embodiment, the composite textile includes at least two internal adhesive layers. In one embodiment, the composite textile includes four or more internal adhesive layers. In one embodiment, the internal adhesive layers are arranged in a stack with adjacent layers in contact with each other. Alternatively, one or more of the plurality of internal adhesive layers is spaced from the other internal adhesive layers along the thickness of the layer, e.g., the fabric layer, in which the plurality of internal adhesive layers is incorporated. In one embodiment, each internal adhesive layer spans the complete length and width of the layer in which the internal adhesive layer is incorporated. Alternatively, one or more of the plurality of internal adhesive layers only cover a portion of the length and width or area of the layer in which those internal adhesive layers are incorporated. In one embodiment, a set of the plurality of internal adhesive layers are positioned in a non-overlapping arrangement at a common depth within the layer in which the internal adhesive layers are incorporated. In one embodiment, the internal adhesive layers are spaced from the upper and lower surfaces of the layer in which the internal adhesive layers are incorporated by an initial distance. In one embodiment, the location of one or more internal adhesive layers and the associated initial distances are varied.

In one embodiment, the plurality of internal adhesive layers includes three internal adhesive layers. The three internal adhesive layers include a first internal adhesive layer located within a fabric layer between the fabric layer upper surface and the fabric layer lower surface. The first internal adhesive layer is the top adhesive layer, closest to the exposed top surface or fabric layer upper surface. The three internal adhesive layers also include a second internal adhesive layer disposed within the fabric layer. The second internal adhesive layer is the next adhesive layer and is positioned under the first internal adhesive layer. In one embodiment, the second internal adhesive layer is located in the middle or center of the three internal adhesive layers. A third internal adhesive layer is disposed within the fabric layer and is positioned under the second internal adhesive layer. In one embodiment, the third internal adhesive layer is located at the lowest strata of the fabric layer. In one embodiment, at least one external layer, which is a fourth adhesive layer, is included in the composite textile and is positioned between the fabric layer and the backing layer.

The weight per unit area and the melt index of each internal adhesive layer and external adhesive layer is selectively adjusted to optimize surface stabilization by penetration between and encapsulation of the lower parts of the yarns or fibers of the fabric layer that extend to or reach the surface and to secure adhesion to the backing layer without propagation of adhesive to the exposed fabric layer upper surface and fabric layer lower surface and without crushing the fabric layer or backing layer with excessive heat or pressure. Furthermore, the polymer chemistry of each internal adhesive layer and external adhesive layer is selectively adjusted to provide or enhance chemical adhesion between layers within the fabric layer, between the fabric layer and the backing layer, among the fibers within the fabric layer and backing layer, within the fabric yarns and among the fibers within the fabric yarns.

The selection of polymers and the levels of melt indexes takes into account secondary needs, for example, the avoidance of high friction against machine elements used to form the fabric layer and composite textile. These machine elements include, for example, guiding bars, guiding plates and piercing needles. Polymer and melt index selection also takes into account the need to maintain flatness and to resist deformation due the mechanical stresses. Furthermore, in selected cases, the layers of the composite textile including one or more adhesive layers are able to be preshrunk with heat or to resist shrinkage or elongation under stress. These desired qualities in the fabric layer and composite textile are advantageously achieved by balancing the chemical compatibility, weights, melt indexes, and melting points of the individual adhesive layers versus the chemical compositions, porosity, and morphology of the fabric layer and backing layer.

In accordance with exemplary embodiments, a stronger mechanical bond between two porous layers in the composite textile is achieved using an adhesive layer having a lower melt index. A poor mechanical bond results from an adhesive layer having a low viscosity and a higher melt index as the molten adhesive proceeds prematurely deep into the backing layer, leaving the interface between the fabric layer and the backing layer with limited adhesive. For a highly porous fibrous cushioning backing layer, an adhesive layer is selected such that the molten adhesive retains a sufficiently high viscosity to prevent flow and saturation of the molten adhesive deep into the backing layer.

Exemplary embodiments adjust the melt indexes and weights of the adhesive layers in accordance with the chemical composition, and porosity of the fabric layer and backing layer, the chemical composition of the adhesive layers and the location of the adhesive layers within the composite textile. As used herein, the "melt index" or "Melt Flow Index" is defined by ASTM Test D1238 as the number of grams per minute of molten polymer forced to flow at a pre-selected temperature at which the polymer melts through an apparatus under a standard pressure defined by the test. In general, the higher the melt flow index the greater the amount of material that will flow over a given period of time. For two different materials having different melt flow indexes, one of the materials, relative to the other material, has a high melt index (HMI), and the other material has a low melt index (LMI). Exemplary embodiments leverage this difference between the LMI and HMI in the materials forming the various internal and external adhesive layers.

Suitable internal and external adhesive layers, including both LMI materials and HMI materials, include, but are not limited to, solid layers, interrupted non-continuous layers, perforated layers, layers of dry-applied powders, powders applied in a liquid suspension and pre-dried, solutions that solidify and subsequently melt, and combinations thereof. In one embodiment, the plurality of internal adhesive layers and external adhesive layers is pre-bonded or pre-attached together prior to being incorporated into the fabric layer or placed between the fabric layer and the backing layer. In another embodiment, each adhesive layer is incorporated separately or individually. In one embodiment, the adhesive layers are incorporated into the fabric layer or placed between the fabric layer and the backing layer in a solid, inactivated state. Whether pre-bonded or layered in place, heat or heat and pressure are subsequently applied to activate the adhesive layers to generate molten adhesive that moves through the fabric layer and into the backing layer, inter-bonding fibers in the fabric layer and bonding the fabric layer to the backing layer.

When both LMI and HMI adhesive layers are used, for example, in the plurality of internal adhesive layers, as pressure and heat are applied the internal adhesive layers containing LMI material initially stay intact and temporarily block the molten adhesive flow of the adjacent internal adhesive layers containing HMI material away from the more porous or more receptive adjacent elements or surfaces and towards the less receptive or less porous elements or surfaces. Directing and blocking of HMI molten adhesive continues until initiation or activation of the LMI internal adhesive layer. The LMI molten adhesive also flows into surrounding interstices to complement the function of the HMI molten adhesive.

An advantage achieved by using HMI layers in combination with LMI layers is that composite layers of blown films can be used. These composite layers using blown films eliminate the need for separate, individual layers that are separately stored and deployed. Composite layers of blown films reduce the overall cost of the internal adhesive layer as the blown LMI sublayers can be of a lower polymeric quality and lower cost. Also, the use of blown films allows for a very precise and controlled incorporation of internal adhesive layers into the fabric layer. In addition, blown LMI sublayers can be heat shrinkable, which facilitates pre-bulking of the fabric layer at low temperatures below the melting point of all components. Therefore, blown LMI sublayers are ideal for pre-finishing the fabric layer in which the LMI sublayers are contained and for subsequently securing the fabric layer to the backing layer. In addition, the blown LMI sublayers allow three-dimensional formation, either simultaneously with bonding to the backing layer or subsequent to bonding the fabric layer to the backing layer, as these LMI sublayers offer minimal resistance at temperatures above their melting points. Blown composite LMI and HMI films have a large range of thicknesses, e.g., in the range of from about 0.5 to about 10 or 15 thousandths of an inch (roughly 100 to 3000 micron). This range of thicknesses facilitates an economical use of adhesives and avoids undesired stiffness. In one embodiment, the fabric layer is preheated to a temperature below the melting point of the LMI Layer to shrink the layer and bulk the fabric prior to the application of pressure and heat to activate the internal adhesive layers. Similarly, the fabric layer can be simultaneously attached to the backing layer, with or without simultaneous embossing.

In one embodiment, the fabric layer, internal adhesive layers, external adhesive layers and backing layer each contain a single type of polymer. In another embodiment, one or more of the fabric layer, internal adhesive layers, external adhesive layers and backing layer contain a plurality of different polymers. Suitable polymers for the plurality of internal adhesive layers and external adhesive layers, e.g., the first internal adhesive layer, the second internal adhesive layer, the third internal adhesive layer and the external adhesive layer, the fabric layer and the backing layer include, but at not limited to, poly-olefin, polyethylene, polypropylene, polyester, ethylene vinyl acetate, co-polyester, polyethylene terephthalate (PET), polyethylene terephthalate glycol (PETG), ethylene acrylic acid (EAA), ethylene methyl acrylate (EMA), ethylene-vinyl acetate (EVA), ethylene methyl acrylate with maleic anhydride, ethylene acrylic acid with maleic anhydride, ethylene vinyl acetate with maleic anhydride and combinations thereof. Polymers or adhesives with ethylene methyl acrylate with maleic anhydride (1-28%), ethylene acrylic acid with maleic anhydride (1-28%) and ethylene vinyl acetate with maleic anhydride (1-28%), can increase chemical bonding to a polyester yarn. Co-polyester, already being in the polyester family, can also offer enhanced chemical compatibility adhesion.

Examples of non-compatible materials that would not form a chemical bond include adhesive layers, fabric layers and backing layers made of different polymers that require higher concentrations, weights and densities of adhesive to achieve a mechanical bond by filling voids on either side without progressing deeper into adjacent strata and to form dense and strong bonds by enveloping the fibers of a porous fabric layer or backing layer. Examples of incompatible chemistries include polyester yarns in combination with polypropylene, polyethylene, ethylene vinyl alcohol with no maleic anhydride, EMA with no maleic anhydride, and EAA with no maleic anhydride adhesives.

In one embodiment, the first internal adhesive layer has a chemical composition compatible with the fibers in the upper strata of the fabric layer. In addition, the first internal adhesive layer has an appropriately high melt index to penetrate the spaces between fibers, yarns and yarn bundles within the lower part of the upper strata of the fabric layer, forming a chemical bond with the fibers in the depth of the fiber layer to which it reaches and a mechanical bond without excessive heat and pressure. The first internal adhesive layer also has a limited weight per unit area to avoid propagation of molten adhesive to the fabric layer upper surface.

In one embodiment, the second internal adhesive layer has a low melt index. In one embodiment, this low melt index is substantially lower than the melt indexes of the first internal adhesive layer and the third internal adhesive layer. In one embodiment, the melt index of the second internal adhesive layer is less than 1.0 g/10 min, preferably less than 0.5 g/10 min. The second internal adhesive layer temporarily blocks the flow of molten adhesive from the first internal adhesive layer towards the lower strata of the fabric layer, i.e., away from the upper fabric surface. In addition, the second internal adhesive layer temporarily blocks the flow of molten adhesive from the third internal adhesive layer towards the upper strata of the fabric layer. In one embodiment, the weight per unit area of second internal adhesive layer is limited to avoid stiffening the fabric layer and the composite textile with excessive and unnecessary adhesive.

In one embodiment, the ratio between the melt index of the second internal adhesive layer and the first internal adhesive layer is at least 10/1. In one embodiment the ratio between the melt index of the third internal adhesive layer and the first internal adhesive layer is greater than 10/1. In one embodiment, the ratio between the melt index of either the first internal adhesive layer or the third internal adhesive layer and the second internal adhesive layer is greater than 5/1. In one embodiment, the melt index of the third internal adhesive layer is at least 25% higher than the melt index of the second internal adhesive layer. The weights and melt indexes of the adhesive layers is varied depending upon the physical and chemical properties of the other adhesive layers and other layers over and under the adhesive layers. In one embodiment, the second internal adhesive layer has a relatively low melt index, and the melt index of the first and third layers are selectively adjusted to accelerate or retard melt flow depending upon the porosity and receptivity of the strata above and below.

Heat or heat and pressure are applied to the fabric layer, the backing layer or the fabric layer and the backing layer to activate the internal and external adhesive layers. In one embodiment, activation of the adhesive layers is performed with heated embossing tools applied from the fabric layer upper surface to produce a three-dimensional composite textile. In one embodiment, embossing is performed after the fabric layer and backing layer are inter-bonded using flat or smooth-surfaced tooling. Embossing can also be performed via a heavily textured deeply engraved roll or plate. In one embodiment, the composite of the fabric containing the multiple adhesive layers, the external additional adhesive layer, if any, and the backing layer, is preheated before the composite is subjected to the embossing action. In one embodiment, the composite is preheated under low pressure, using a dual belt laminator or a blanket-and-roll laminator before being transferred to an embossing calendar.

Referring initially to FIG. 1, an embodiment of a composite textile 100 is illustrated. The composite textile includes a fabric layer 101 having a fabric layer upper surface 106, a fabric layer lower surface 109 opposite the fabric layer upper surface, and a plurality of internal adhesive layers 105 disposed between the fabric layer upper surface and the fabric layer lower surface. The plurality of internal adhesive layers divides the fabric layer into a first fabric sublayer 103 adjacent the fabric layer upper surface and a second fabric sublayer 104 adjacent the fabric layer lower surface. In one embodiment, the first fabric sublayer is separate from the second fabric sublayer. As illustrated, the first fabric sublayer includes the upper strata and the top surface of the fabric layer and composite textile. The second fabric sublayer includes the lower strata of the fabric layer. The thicknesses of the first and second fabric sublayers can be the same or can be different. In one embodiment, the second fabric sublayer is thinner, placing the lowest internal adhesive layer closer to the fabric layer lower surface. The composite textile includes a backing or backing layer 102 in contact with the fabric layer lower surface. The backing layer includes the bottom surface 110 of the composite textile opposite the top surface 106.

The plurality of internal adhesive layers 105 is disposed between at least a portion of the first fabric sublayer and the second fabric sublayer. Preferably, the plurality of internal adhesive layers extends over the entire area of the fabric layer completely between the first fabric sublayer and the second fabric sublayer. In one embodiment, the composite textile includes at least two internal adhesive layers, providing for the direction of the flow of molten adhesive in one direction. In one embodiment, the composite textile product includes at least three internal adhesive layers, providing for the direction of flow of molten adhesive in two directions. In one embodiment, the composite textile includes at least four internal adhesive layers. As illustrated, the composite textile includes three separate internal adhesive layers, a first internal adhesive layer 111, a second internal adhesive layer 112 and a third internal adhesive layer 113. The first internal adhesive layer 111 is in contact with the first fabric sublayer 103 opposite the fabric layer upper surface, and the third internal adhesive layer is in contact with the second fabric sublayer 104. The second internal adhesive layer is disposed between and in contact with the first internal adhesive layer and the third internal adhesive layer.

In one embodiment, the second internal adhesive layer 112 is chemically compatible with the first internal adhesive layer 111 and the third internal adhesive layer 113 to ensure continuity of adhesion through the internal adhesive layers between the two fabric sublayers. In one embodiment, the second internal adhesive layer 112 may not be chemically compatible with one or more of the first internal adhesive layer, the third internal adhesive layer and the fibers or yarns in the fabric layer. These fibers and yarns include fibers and yarns passing through the second internal adhesive layer. When the composite textile includes fibers or yarns passing through the second adhesive layer, continuity of adhesion is provided by these fibers or yarns.

In one embodiment, the third internal adhesive layer 113 is located within the lower strata of the fabric layer. The weight per unit area and melt index of the third adhesive layer 113 are selected to provide sufficient flow of molten adhesive through the lower strata of the fabric layer, past the fabric layer lower surface and into the upper strata of the backing layer 102 to a desired depth 108. In one embodiment, the melt index of the third internal adhesive layer is selected relative to the melt indexes of the first and second internal adhesive layers. The bond between the fabric layer and the backing layer is a mechanical bond or a chemical bond with the individual fibers. The chemical bond is dependent upon the compatibility between the chemical composition of the third internal adhesive layer 113 and the backing layer as well as other properties such as but not limited to their configuration, densities and surface area of each layer.

In one embodiment, the upper strata of the backing layer is porous, and the third internal adhesive layer 113 is not chemically compatible with the fibers within the lower strata of the fabric layer and is chemically compatible with the porous upper strata of the backing layer. In one embodiment, to avoid excessive progression or penetration of the molten adhesive from the third internal adhesive layer into the backing layer a relatively lower melt index is used in the third adhesive layer 113. Excessive progression or penetration of the third adhesive layer into the lower strata of the fabric layer leaves the fabric layer without sufficient mechanical adhesive bonding and produces a poor bond between the fabric layer and the backing layer. Therefore, the melt index of the third internal adhesive layer 113 that is chemically incompatible with the lower strata of the fabric layer is reduced. The molten adhesive from this third internal adhesive layer progresses to a relatively shallow depth into the backing layer and forms a solid and dense mechanical bond to the backing layer without the assistance of chemical bonding. The depth of the third adhesive layer within the fabric layer is varied, i.e., closer or farther away from the interface between the fabric layer and the backing layer.

In one embodiment, two separate fabric sublayers 103 and 104 are joined by the first internal adhesive layer 111, the second internal adhesive layer 112 and the third internal adhesive layer 113 to form the fabric layer 101. The fabric layer is attached to the backing layer 102 to form the composite textile 100. The lower fabric sublayer 104 is relatively thin, positioning the third internal adhesive layer 113 close to the fabric layer lower surface 109 that is the interface between the fabric layer 101 and the backing layer 102. The composition and properties of all layers are mutually adjusted as described herein to result in the propagation of molten adhesive into the upper fabric sublayer 103 to a given height 107 without reaching the fabric layer upper surface 106. The composite and properties are also adjusted to result in the propagation of molten adhesive from the third internal adhesive layer 113 into and through the lower fabric sublayer 104 into the backing layer 102 down to a given depth 108.

Figure 6:
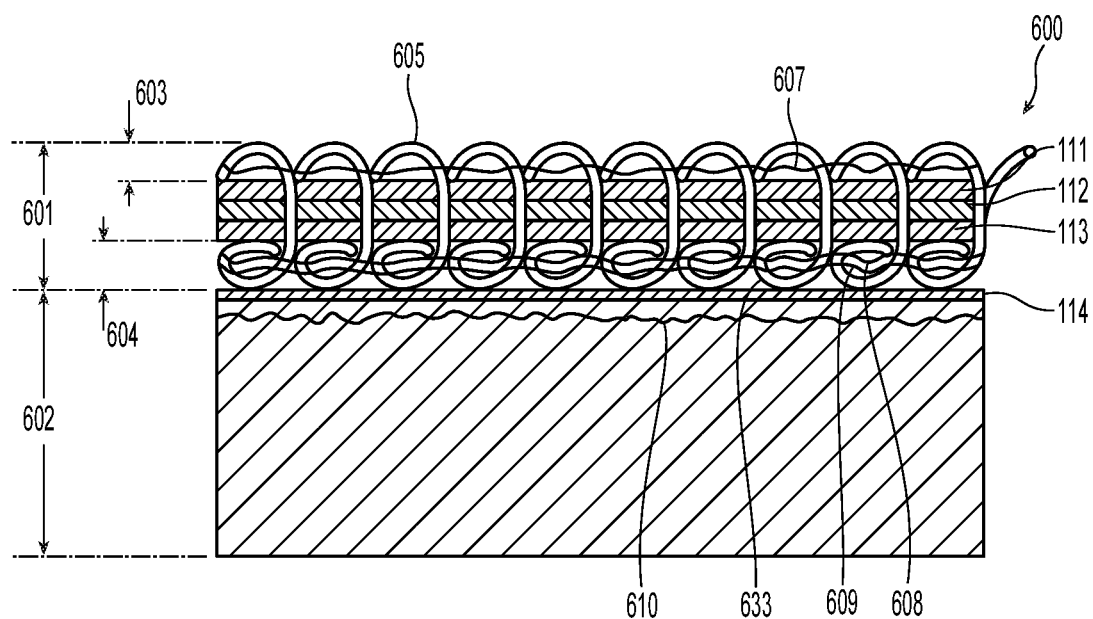
FIG. 6 is a schematic representation of composite textile containing a stitch-bonded fabric layer wherein the three internal adhesive layers are within the upper strata of the stitch-bonded fabric layer and a fourth external adhesive layer is placed between the fabric layer and the cushioning backing layer.

In one embodiment, at least one external adhesive layer 114 is placed between the fabric layer lower surface 109 and the backing layer 102. An example of this external adhesive layer is shown in FIG. 6 and discussed below. Molten adhesive from the external adhesive layer 114 proceeds into the lower strata of the fabric layer to a desired molten adhesive height and into the backing layer to the molten adhesive depth 108. If the backing layer is relatively porous, the external adhesive layer 114 is assigned a low melt index and sufficient weight to facilitate a mechanical bond between the fabric layer and the backing layer. Alternately, the external adhesive layer 114 is assigned a higher melt index if the backing layer is relatively dense. If the external adhesive layer 114 is chemically compatible with the fibers within the lower strata of the fabric layer and with the upper strata of the backing layer, mechanical and chemical bonding are simultaneously achieved requiring limited amounts of adhesive.

Exemplary embodiments are direct to a method for creating the composite textile. A plurality of separate internal adhesive layers is incorporated into a fabric layer having a fabric layer upper surface and a fabric layer lower surface opposite the fabric layer upper surface. The plurality of internal adhesive layers is disposed between and spaced from the fabric layer upper surface and the fabric layer lower surface. Suitable fabric layers include stitch-bonded fabric layers, needle-punched fabric layers and tufted fabric layers. In one embodiment, the fabric layer is a stitch-bonded fabric layer, and incorporating the plurality of internal adhesive layers includes using the plurality of internal adhesive layers as a stitching substrate for the stitch-bonded fabric layer. In one embodiment, a heat-shrinkable internal adhesive layer is included in the plurality of internal adhesive layers and incorporated into the fabric layer.

In one embodiment, at least three separate internal adhesive layers are incorporated into the fabric layer. In one embodiment, a first internal adhesive layer, a second internal adhesive layer and a third internal adhesive layer are incorporated into the fabric layer such that the second internal adhesive layer is in contact with the first internal adhesive layer, the first internal adhesive layer is disposed between the fabric layer upper surface and the second internal adhesive layer, the third internal adhesive layer is in contact with the second internal adhesive layer, and the third internal adhesive layer is disposed between the fabric layer lower surface and the second internal adhesive layer. In one embodiment, a distance between the third internal adhesive layer and the fabric layer lower surface is varied. In one embodiment, at least one external adhesive layer is incorporated in the composite textile between the fabric layer lower surface and the backing layer. In one embodiment, the external adhesive layer has a melt index of less than 1.0 g/10 min, preferably less than 0.5 g/10 min.

A backing layer is placed against the fabric layer lower surface. In one embodiment, the fabric layer, the backing layer, the first internal adhesive layer, the second internal adhesive layer and the third internal adhesive layer are selected to have a desired chemical compatibility or incompatibility among the fabric layer, the first internal adhesive layer, the second internal adhesive layer, the third internal adhesive layer and the backing layer. In addition, these layers are selected to have desired or pre-determined melt indexes among the fabric layer, the first internal adhesive layer, the second internal adhesive layer, the third internal adhesive layer and the backing layer.

In one embodiment, the chemical compatibility among the fabric layer, the internal adhesive layers and the backing layer or varying melt indexes among the fabric layer, the internal adhesive layers and the backing layer is varied. In one embodiment, the first internal adhesive layer is selected to have a material that is chemically compatible with fibers in the fabric layer, and the second internal adhesive layer is selected to have a lower melt index than the first internal adhesive layer and the third internal adhesive layer. In one embodiment, a weight of first internal adhesive layer per unit area of the fabric layer is selected and incorporated to generate an amount of first molten polymer to move through the fabric layer without reaching the fabric layer upper surface. In one embodiment, the third internal adhesive layer is selected to contain a material that is chemically compatible with fibers in the fabric layer. In one embodiment, the second internal adhesive layer is selected to have a melt index of less than 1.0 g/10 min, preferably less than 0.5 g/10 min. In one embodiment, the third internal adhesive layer is selected to contain a material that is chemically compatible with the backing layer and that has a melt index less than 1.0 g/10 min. In one embodiment, the external adhesive layer contains a material that is chemically compatible with fibers in the fabric layer and the backing layer.

In one embodiment, the fabric layer, one or more of the plurality of internal adhesive layers or the backing layer is selected to include polyesters, polyolefin, a PTEG polymer, an EVA polymer, an EAA polymer or an EMA polymer. In one embodiment, the fabric layer, the first internal adhesive layer, the second internal adhesive layer and the third internal adhesive layer are selected to include EVA polymer, EAA polymer or EMA polymer, and the percentages of maleic anhydride among the fabric layer, the first internal adhesive layer, the second internal adhesive layer and the third internal adhesive layer are varied. In one embodiment, the third internal adhesive layer and the backing layer are selected to include EVA polymer, EMA polymer or EAA polymer, and levels of maleic anhydride between the third internal adhesive layer and the backing layer are varied.

Heat or heat and pressure is applied to one or more of the fabric layer and backing layer to generate molten adhesive from the internal adhesive layers, to move the molten adhesive within the fabric layer and to laminate the fabric layer to the backing layer. In one embodiment, a first molten adhesive is generated from the first internal adhesive layer that moves through the fabric layer, forms chemical bonds with the fibers in the fabric layer and does not reach the fabric layer upper surface. A third molten adhesive is generated from the third internal adhesive layer that moves through the fabric layer, past the fabric layer lower surface and into the backing layer to bond the fabric layer to the backing layer. In one embodiment, first molten adhesive is generated from the first internal adhesive layer that encapsulates individual fibers within the fabric layer and forms mechanical bonds and chemical bonds with the individual fibers. In one embodiment, third molten adhesive is generated from the third internal adhesive layer to form mechanical bonds and chemical bonds with individual fibers in the fabric layer. In one embodiment, third molten adhesive is generated from the third internal adhesive layer that moves through the fabric layer toward the fabric layer lower surface and does not reach the fabric layer upper surface, and external molten adhesive is generated from the external adhesive layer that bonds the fabric layer and the backing layer. In one embodiment, molten adhesive is generated from the external adhesive layer to form mechanical bonds and chemical bonds with the fibers in the fabric layer and the backing layer.

When a heat-shrinkable internal adhesive layer is included in the plurality of internal adhesive layers, the heat-shrinkable internal adhesive layer is shrunk with heat to bulk the stitch-bonded fabric layer before applying higher temperatures, pressures or higher temperatures and pressures to bond the fabric layer to the backing layer. In one embodiment, the fabric layer upper surface is contacted with a heated three-dimensional tool to emboss a three-dimensional pattern into the composite textile while applying heat or heat and pressure. In one embodiment, the composite textile is preheated in a constrained space before laminating and embossing using elevated heat and pressure. Suitable methods for preheating the composite textile include, but are not limited to, preheating the composite textile fabric with a dual belt laminator or a blanket laminator. In one embodiment, the composite textile is post-embossed with a three-dimensional heated tool after applying heat or heat and pressure.

Figure 2:
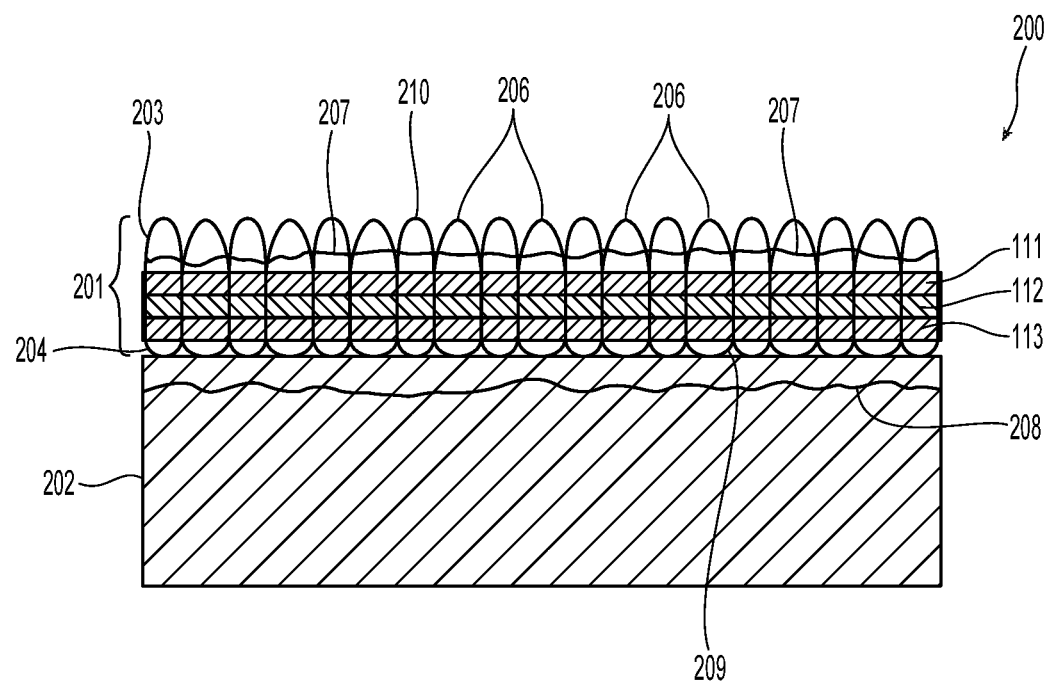
FIG. 2 is a generalized schematic representation of an embodiment of a composite textile containing a fabric layer formed with yarns passing through and alternating over and under three internal adhesive layers and forming the top and bottom of the fabric layer, placed directly over a cushioning backing layer.

Referring now to FIG. 2, a composite textile 200 is illustrated containing a plurality of yarns 206 forming the fabric layer 201 by alternating between the top portion 203 and the bottom portion 204 of the fabric layer through the first internal adhesive layer 111, the second internal adhesive layer 112 and the third internal adhesive layer 113. The bottom of the fabric layer 209 is placed over the top of the backing layer 202. The third internal adhesive layer 113 is located in the proximity of the interface 209 between the fabric layer 201 and the backing layer 202. As explained above in relation to FIG. 1, the adhesives are selected to penetrate into the top portion of the fabric layer toward the top surface 210 up to a given height 207, and into the backing layer down to a given depth 208. The plurality of internal adhesive layers functions, for example, as a stitching substrate or a part of the stitching substrate or primary backing.

Figure 3:
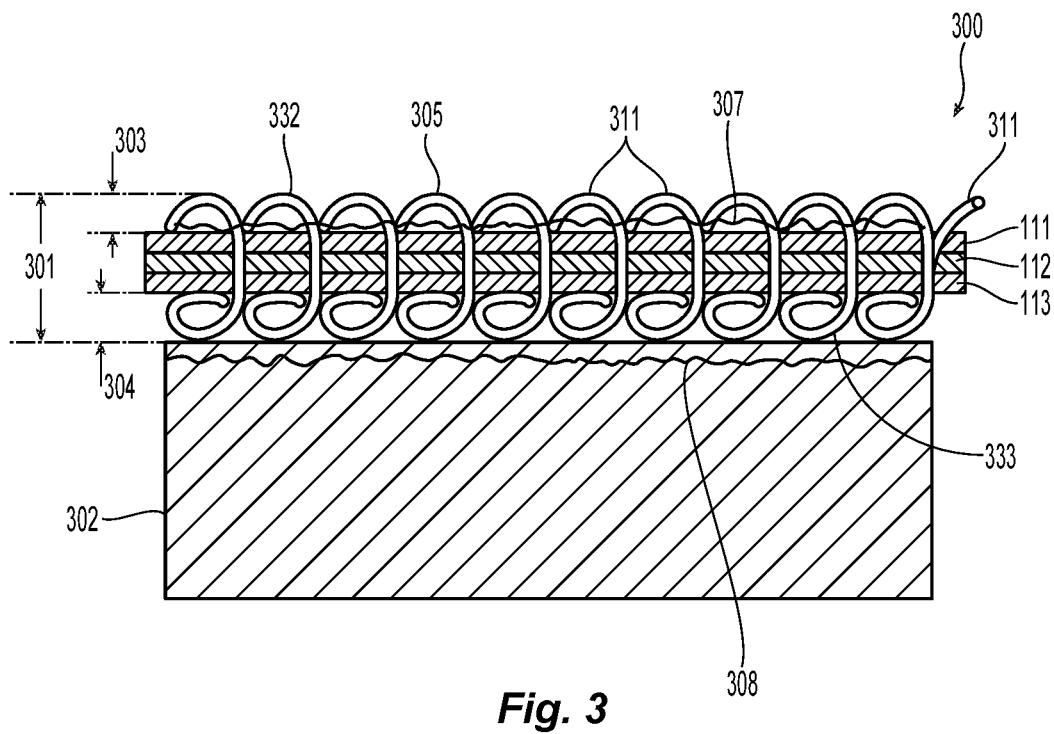
FIG. 3 is a schematic representation of an embodiment of a composite textile wherein the fabric layer is stitch-bonded with the three internal adhesive layers used as a stitching substrate penetrated by yarns forming the upper and lower parts of the fabric layer with underlaps and overlaps.

Referring to FIG. 3, an embodiment of a stitch-bonded fabric composite textile 300 containing a stitch-bonded fabric layer 301 is illustrated. The first internal adhesive layer 111, the second internal adhesive layer 112 and the third internal adhesive layer 113 are incorporated into the fabric layer by forming the stitch-bonded fabric layer using the first internal adhesive layer 111, the second internal adhesive layer 112 and the third internal adhesive layer 113 as a multi-layer stitching substrate. A plurality of yarns 311 form the top fabric sublayer 303 with overlaps 332 and the bottom fabric sublayer 304 of the fabric with underlaps 333. The underlaps are placed against the top of backing layer 302. In one embodiment, stitch-bonding is performed with sinker bars varying the depth of the overlaps and the depth of the underlaps. These depths facilitate placing the overlaps above the first internal adhesive layer 111 and the underlaps below the third internal adhesive layer 113. Controlling the placement of the internal adhesive layer within a stitch-bonded structure aids in the control of the propagation of the first internal adhesive layer into the overlaps and the propagation of the third internal adhesive layer into the underlaps when heat, pressure or heat and pressure is applied to the structure.

In one embodiment, the first internal adhesive layer 111, the second internal adhesive layer 112 and the third internal adhesive layer 113 are shrunk after stitching to bulk the stitch-bonded fabric layer. Therefore, at least one of the three internal adhesive layers is shrinkable at a temperature lower than the melting temperature of the yarns forming the stitched-bonded fabric layer. Additional heat or heat and pressure are then applied to generate molten adhesive from the internal adhesive layers that penetrates into the top portion of the stitched-bonded fabric layer toward the fabric layer upper surface 305 up to a given height 307, and into the backing layer down to a given depth 308.

As discussed above, the selection of the internal adhesive layers is subject to the same criteria aimed at promoting the propagation of molten adhesive from the first internal adhesive layer 111 to an intermediate height 307 below the fabric layer upper surface 305 with the ability to form mechanical bonds, and preferably mechanical and chemical bonds by reaching into the spaces between the yarns as well as into the interstices between fibers within the yarns. In addition, the third internal adhesive layer 113 is selected to proceed into the backing layer to a limited depth 308, securing the fabric to the backing layer. Molten adhesive from the third internal adhesive layer also reaches the spaces between fibers and yarns and within the yarns forming the underlaps 333 within the bottom fabric sublayer 304, and the spaces within the backing layer 302 above the depth 308, preferably forming chemical as well as mechanical bonds. In one embodiment, the internal adhesive layers are selected to avoid the polymers in the adhesive layers that generate high friction against the entering stitching needles, in particular in the first internal adhesive layer 111.

Figure 4:
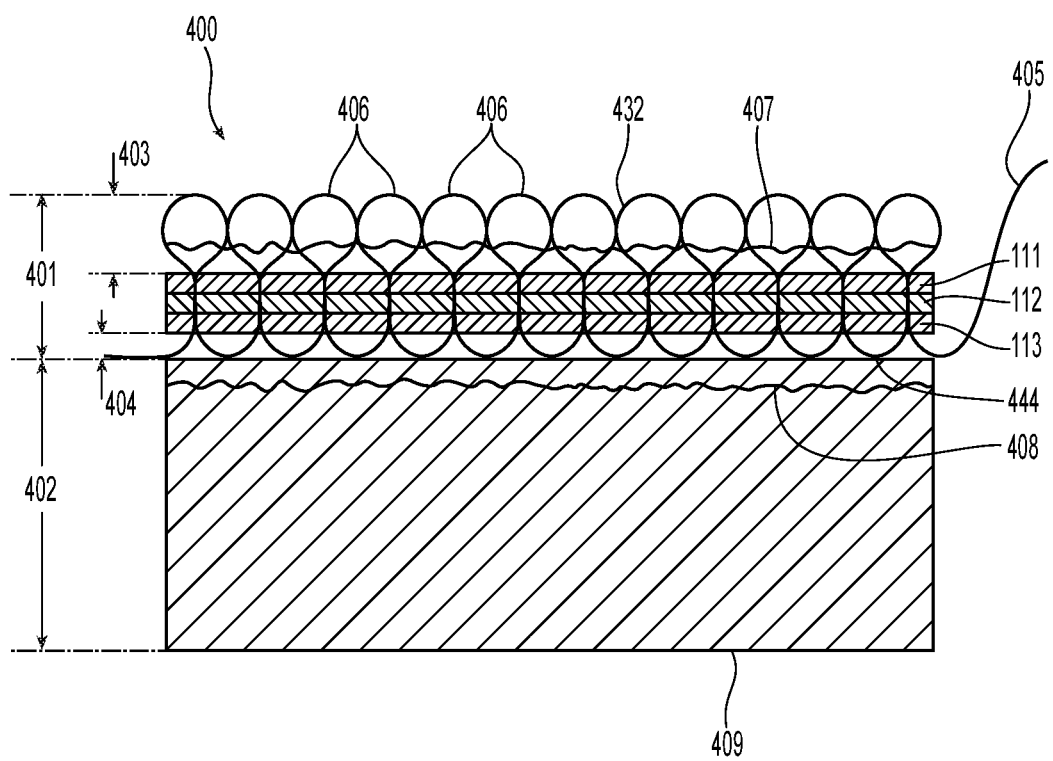
FIG. 4 is a schematic representation of an embodiment of a composite textile wherein the fabric layer is a tufted fabric and wherein the upper and lower fabric layers are formed with yarns penetrating the three internal adhesive layers and forming the upper and lower parts of the fabric layer with pile loops and back-laps, placed over a cushioning backing layer.

Referring to FIG. 4, a tufted composite textile 400 containing a tufted fabric layer 401 attached to a backing layer 402 is illustrated. The backing layer 402 replaces traditional thinner secondary backing layers. The tufted fabric layer 401 is formed by tufting yarns 405 to form the back part or bottom fabric sublayer 404 of the fabric layer with tufts 406 forming the top fabric sublayer 403 and upper surface 432. The first internal adhesive layer 111, the second internal adhesive layer 112, and the third internal adhesive layer 113 are incorporated into the tufted fabric layer by the tufting yarns penetrating through the first internal adhesive layer 111, the second internal adhesive layer 112, and the third internal adhesive layer 113. Tufting yarns through the internal adhesive layers also forms the lower portion of the fabric layer 404 with back-laps 444. The internal adhesive layers, therefore, replace the traditional primary backing. Since the tufted fabric layer must hold the tufts securely without slipping and deformation prior to the application of heat, one or more of the internal adhesive layers 111, 112 and 113 are chosen to provide stability with extra weight, or with a fibrous adhesive sublayer structure similar to commercial primary backings such as woven or nonwoven fabrics or scrims that can hold the tufts prior to the application of adhesive. An example of a layer that provides stability is a spunbonded PET web. In one embodiment, the third internal adhesive layer 113 on the tufting needle entrance side is also chosen to avoid high friction against the entering tufting needles.

The tufted fabric is placed over the backing layer 402 with the back-laps 444 against the backing layer. The properties of all elements of the composite textile are selected or adjusted as described above to advance the molten polymer to a desired height 407 under the top surface 432 and into the backing layer 402 down to the desired depth 408. The backing layer 402 replaces the traditional secondary backings used in the tufting art and can be thinner than shown with the molten adhesive penetration depth 408 reaching the vicinity of the bottom 409 of the backing layer. The impregnation of back-laps in a manner where adhesive reaches the spaces between the yarns as well as the spaces between filaments or fibers within the yarns, preferably with chemical as well as mechanical bonds, is used to maintain tuft integrity, commonly referred to as tuft bind with traffic in tufted floorcoverings.

Figure 5:
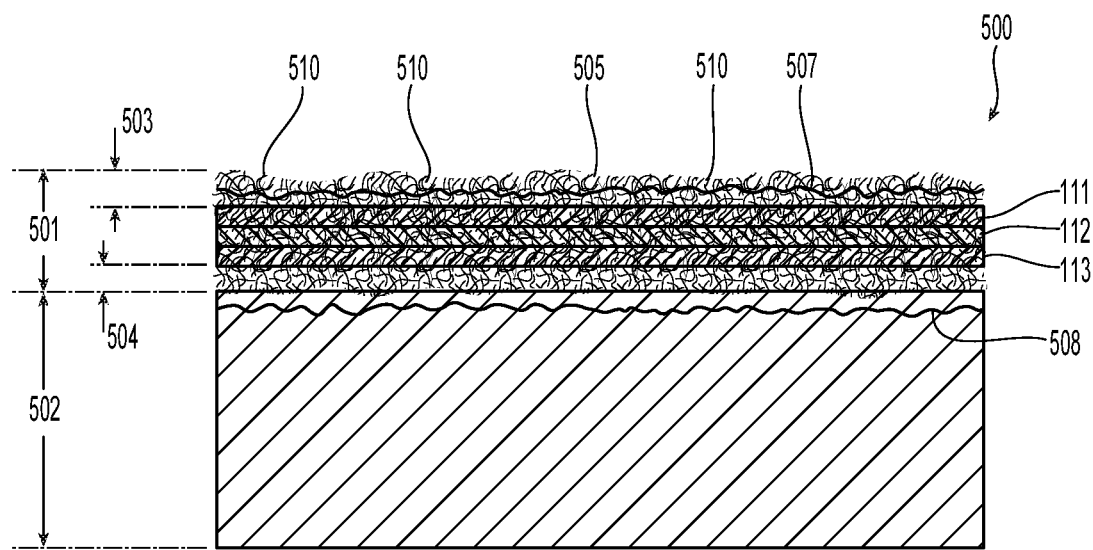
FIG. 5 is a schematic representation of composite textile containing a needle-punched fabric layer placed over a cushioning backing layer and wherein fibers are passing though the three internal adhesive layers and forming the top and bottom layers of the fabric layer.

Referring to FIG. 5, a needle punched fabric layer composite textile 500 is illustrated with a needle punched fabric layer 501 formed with a plurality of fibers 510 needle-punched through the first internal adhesive layer 111, the second internal adhesive layer 112, and the third internal adhesive layer 113. The fibers can be needle-punched one side or both sides of the layer of fibers to form the upper fibrous layer 503 and the lower fibrous layer 504. The fabric layer is positioned over a backing layer 502. The lower fibrous layer 504 is relatively thin, placing the third adhesive layer 113 in the proximity of the top of the backing layer 502. Applying the principles discussed above, heat or heat and pressure are applied to the needle punched fabric layer to generate molten adhesive from the plurality of adhesive sublayers. Molten adhesive from the first internal adhesive layer 111 penetrates up toward the fabric layer upper surface 505 to the desired height 507. Similarly, molten adhesive from the third internal adhesive layer 113 penetrates through the lower strata, i.e., the lower fibrous layer 504, into backing layer 502 and down to the desired depth 508. This joins the needle punched fabric layer and backing layer and stabilizes the top surface 505 of the needle punched fabric layer without adhesive reaching the top surface and without excessive loss of bulk or cushion.

Referring to FIG. 6, a schematic of a composite textile 600 containing a stitch-bonded fabric layer 601 is illustrated. The stitch-bonded fabric layer includes the upper strata 603 and lower strata 604. The illustrated stitch-bonded fabric layer is similar to the stitch-bonded fabric layer illustrated in FIG. 3; however, the underlaps 633 in the lower strata are deeper. Deeper underlaps position the third internal adhesive layer 113 farther away from the interface between the stitch-bonded fabric layer 601 and the backing layer 602. Molten polymer from the third internal adhesive layer 113 descends to the desired depth 608 within the lower strata 605 of the stitch-bonded fabric layer. An external adhesive layer 114 is placed between the stitch-bonded fabric layer 601 and the backing layer 602. Molten adhesive from the external adhesive layer 114 proceeds into the lower strata 604 to an external molten adhesive height 609 and into the backing layer to the external molten adhesive depth 610. In one embodiment, the weights per unit area and melt indexes of the third internal adhesive layer 113, the external adhesive layer 114 or both the third internal adhesive layer 113 and the external adhesive layer 114 are limited if the polymers in those adhesive layers are chemically compatible with the fibers and elements in the stitch-bonded fabric layer and backing layer. Molten adhesive from the first internal adhesive layer 111 penetrates up toward the stitch-bonded fabric layer upper surface 605 to the desired height 607.

In one embodiment the third internal adhesive layer 113 is located away from the bottom of the backing layer and is chemically compatible with the fibers within the stitched-bonded fabric layer. The melt index of the third internal adhesive layer 113 is kept high to ensure penetration among the fibers or yarns and within the yarns located under the second internal adhesive layer 112. In addition, the weight per unit area of the third internal adhesive layer 113 is kept as low as possible to avoid the presence of unnecessary adhesive stiffening the composite textile. The external adhesive layer 114 is present. If the backing layer is relatively porous, the external adhesive layer 114 is assigned a low melt index and sufficient weight per unit area to facilitate a mechanical bond between the stitched-bonded fabric layer and the backing layer. Alternately, the external adhesive layer 114 is assigned a higher melt index if the backing layer is relatively dense. If the external adhesive layer 114 is chemically compatible with the fibers within the lower strata of the stitched-bonded fabric layer and with the upper strata of the backing layer, mechanical and chemical bonding are simultaneously achieved requiring limited amounts of adhesive.

The foregoing written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for creating a composite textile, the method comprising:
   incorporating a plurality of separate internal adhesive layers in a fabric layer comprising a fabric layer upper surface and a fabric layer lower surface opposite the fabric layer upper surface, the plurality of internal adhesive layers disposed between and spaced from the fabric layer upper surface and the fabric layer lower surface;
   placing a backing layer against the fabric layer lower surface; and
   applying heat or heat and pressure to one or more of the fabric layer and backing layer to generate molten adhesive from the internal adhesive layers to move the molten adhesive within the fabric layer and to laminate the fabric layer to the backing layer.

2. The method of claim 1, wherein:
   the fabric layer comprises a stitch-bonded fabric layer; and
   incorporating the plurality of internal adhesive layers comprises using the plurality of internal adhesive layers as a stitching substrate for the stitch-bonded fabric layer.

3. The method of claim 2, wherein:
   incorporating the plurality of internal adhesive layers further comprises including a heat-shrinkable internal adhesive layer in the plurality of internal adhesive layers; and
   the method further comprises shrinking the heat-shrinkable internal adhesive layer with heat to bulk the stitch-bonded fabric layer before applying heat or heat and pressure.

4. The method of claim 1, wherein the fabric layer comprises a needle-punched fabric layer or a tufted fabric layer.

5. The method of claim 1, wherein applying heat or heat and pressure comprises contacting the fabric layer upper surface with a heated three-dimensional tool to emboss a three-dimensional pattern into the composite textile.

6. The method of claim 1, wherein the method further comprises preheating the composite textile in a constrained space before applying heat or heat and pressure.

7. The method of claim 6, wherein preheating the composite textile comprises preheating the composite textile fabric with a dual belt laminator.

8. The method of claim 1, wherein the fabric layer, one or more of the plurality of internal adhesive layers or the backing layer comprises polyesters, polyolefin, a PTEG polymer, an EVA polymer, an EAA polymer or an EMA polymer.

9. The method of claim 1, wherein the method further comprises varying chemical compatibility among the fabric layer, the internal adhesive layers and the backing layer or varying melt indexes among the fabric layer, the internal adhesive layers and the backing layer.

10. The method of claim 1, wherein the method further comprises incorporating at least one external adhesive layer in the composite textile between the fabric layer lower surface and the backing layer.

11. The method of claim 1, wherein incorporating the plurality of separate internal adhesive layers further comprises incorporating at least three separate internal adhesive layers.

12. The method of claim 1, wherein incorporating the plurality of internal adhesive layers comprises incorporating a first internal adhesive layer, a second internal adhesive layer and a third internal adhesive layer into the fabric layer such that the second internal adhesive layer is in contact with the first internal adhesive layer, the first internal adhesive layer is disposed between the fabric layer upper surface and the second internal adhesive layer, the third internal adhesive layer is in contact with the second internal adhesive layer, and the third internal adhesive layer is disposed between the fabric layer lower surface and the second internal adhesive layer.

13. The method of claim 12, wherein:
   the first internal adhesive layer comprises a material that is chemically compatible with fibers in the fabric layer;
   the second internal adhesive layer comprises a lower melt index than the first internal adhesive layer and the third internal adhesive layer; and
   applying heat or heat and pressure to the fabric layer comprises:
      generating a first molten adhesive from the first internal adhesive layer that moves through the fabric layer, forms chemical bonds with the fibers in the fabric layer and does not reach the fabric layer upper surface; and
      generating a third molten adhesive from the third internal adhesive layer that moves through the fabric layer, past the fabric layer lower surface and into the backing layer to bond the fabric layer to the backing layer.

14. The method of claim 13, wherein incorporating the first internal adhesive layer comprises incorporating a weight of first internal adhesive layer per unit area of the fabric layer to generate an amount of first molten polymer to move through the fabric layer without reaching the fabric layer upper surface.

15. The method of claim 12, wherein applying heat or heat and pressure to the fabric layer comprises generating first molten adhesive from the first internal adhesive layer that encapsulates individual fibers within the fabric layer and forms mechanical bonds and chemical bonds with the individual fibers.

16. The method of claim 12, wherein:
   the third internal adhesive layer comprises a material that is chemically compatible with fibers in the fabric layer; and
   applying heat or heat and pressure to the fabric layer comprises generating third molten adhesive from the third internal adhesive layer to form mechanical bonds and chemical bonds with individual fibers in the fabric layer.

17. The method of claim 12, wherein the second internal adhesive layer comprises a melt index of less than 1.0 g/10 min.

18. The method of claim 12, wherein the second internal adhesive layer comprises a melt index of less than 0.5 g/10 min.

19. The method of claim 12, wherein the third internal adhesive layer comprises a material that is chemically compatible with the backing layer and comprises a melt index less than 1.0 g/10 min.

20. The method of claim 12, wherein incorporating the third internal adhesive layer into the fabric layer comprises varying a distance between the third internal adhesive layer and the fabric layer lower surface.

21. The method of claim 12, wherein:
   the fabric layer, the first internal adhesive layer, the second internal adhesive layer and the third internal adhesive layer comprise EVA polymer, EAA polymer or EMA polymer; and the method further comprises varying percentages of maleic anhydride among the fabric layer, the first internal adhesive layer, the second internal adhesive layer and the third internal adhesive layer.

22. The method of claim 12, wherein:
the third internal adhesive layer and the backing layer comprise EVA polymer, EMA polymer or EAA polymer; and
the method further comprises varying levels of maleic anhydride between the third internal adhesive layer and the backing layer.

23. The method of claim 12, wherein:
the method further comprises incorporating at least one external adhesive layer in the composite textile between the fabric layer lower surface and the backing layer; and
applying heat or heat and pressure comprises:
  generating third molten adhesive from the third internal adhesive layer that moves through the fabric layer toward the fabric layer lower surface and does not reach the fabric layer upper surface; and
  generating external molten adhesive from the external adhesive layer that bonds the fabric layer and the backing layer.

24. The method of claim 23, wherein:
the external adhesive layer comprises a material that is chemically compatible with fibers in the fabric layer and the backing layer; and
applying heat or heat and pressure further comprises using the external molten adhesive to form mechanical bonds and chemical bonds with the fibers in the fabric layer and the backing layer.

25. The method of claim 23, wherein the external adhesive layer comprises a melt index of less than 1.0 g/10 min.

26. The method of claim 23, wherein the external adhesive layer comprises a melt index of less than 0.5 g/10 min.

27. The method of claim 1, wherein the method further comprises post-embossing the composite textile with a three-dimensional heated tool after applying heat or heat and pressure.

28. A method for creating a composite textile, the method comprising:
selecting a fabric layer, a backing layer, a first internal adhesive layer, a second internal adhesive layer and a third internal adhesive layer to have chemical compatibility among the fabric layer, the first internal adhesive layer, the second internal adhesive layer, the third internal adhesive layer and the backing layer and to have desired melt indexes among the fabric layer, the first internal adhesive layer, the second internal adhesive layer, the third internal adhesive layer and the backing layer;
incorporating the first internal adhesive layer, the second internal adhesive layer and the third internal adhesive layer into the fabric layer between a fabric layer upper surface and a fabric layer lower surface opposite the fabric layer upper surface such that the second internal adhesive layer is in contact with the first internal adhesive layer, the first internal adhesive layer is disposed between the fabric layer upper surface and the second internal adhesive layer, the third internal adhesive layer is in contact with the second internal adhesive layer, and the third internal adhesive layer disposed between the fabric layer lower surface and the second internal adhesive layer;
placing a backing layer against the fabric layer lower surface; and
applying heat or heat and pressure to one or more of the fabric layer and backing layer to generate molten adhesive from the first internal adhesive layer, the second internal adhesive layer and the third internal adhesive layer, to move the molten adhesive within the fabric layer and to laminate the fabric layer to the backing layer by establishing mechanical bonds, chemical bonds or chemical and mechanical bonds among the fabric layer, first molten adhesive from the first internal adhesive layer, second molten adhesive from the second internal adhesive layer, third molten adhesive from the third internal adhesive layer and the backing layer.

29. A composite textile comprising:
a fabric layer comprising a fabric layer upper face and a fabric layer lower face opposite the fabric layer upper face;
a first internal adhesive layer disposed in the fabric layer;
a second internal adhesive layer disposed in the fabric layer in contact with the first internal adhesive layer, the first internal adhesive layer disposed between the fabric layer upper surface and the second internal adhesive layer;
a third internal adhesive layer disposed on the fabric layer in contact with the second internal adhesive layer, the third internal adhesive layer disposed between the fabric layer lower surface and the second internal adhesive layer; and
a backing layer in contact with the fabric layer lower surface and bonded to the fabric layer by the third internal adhesive layer;
wherein the first internal adhesive layer and the third internal adhesive layers comprise materials that are chemically compatible with fibers in the fabric layer, a weight of the first internal adhesive layer per unit area of the fabric layer is sufficient to generate an amount of first molten polymer to move through the fabric layer without reaching the fabric layer upper surface, and the second internal adhesive layer comprises a lower melt index than the first internal adhesive layer and the third internal adhesive layer.

* * * * *